(12) United States Patent
Chang et al.

(10) Patent No.: US 11,678,238 B2
(45) Date of Patent: Jun. 13, 2023

(54) METHOD PERFORMED BY USER EQUIPMENT, USER EQUIPMENT, AND HANDOVER COMMAND GENERATION METHOD

(71) Applicants: SHARP KABUSHIKI KAISHA, Sakai (JP); FG Innovation Company Limited, Tuen Mun (HK)

(72) Inventors: Ningjuan Chang, Shanghai (CN); Renmao Liu, Shanghai (CN)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/270,608

(22) PCT Filed: Aug. 1, 2019

(86) PCT No.: PCT/CN2019/098851
§ 371 (c)(1),
(2) Date: Feb. 23, 2021

(87) PCT Pub. No.: WO2020/042863
PCT Pub. Date: Mar. 5, 2020

(65) Prior Publication Data
US 2021/0337443 A1    Oct. 28, 2021

(30) Foreign Application Priority Data
Aug. 27, 2018    (CN) .......................... 201810984346.8

(51) Int. Cl.
*H04W 4/00* (2018.01)
*H04W 36/00* (2009.01)

(52) U.S. Cl.
CPC . *H04W 36/00837* (2018.08); *H04W 36/0038* (2013.01); *H04W 36/0058* (2018.08); *H04W 36/0079* (2018.08)

(58) Field of Classification Search
CPC ....... H04W 36/00837; H04W 36/0079; H04W 36/0058; H04W 36/0038
See application file for complete search history.

(56) References Cited

U.S. PATENT DOCUMENTS

| 2014/0126545 A1* | 5/2014 | Tamura | ............. | H04W 36/0069 370/332 |
| 2016/0150455 A1* | 5/2016 | Suryavanshi | ....... | H04W 36/245 455/436 |

(Continued)

FOREIGN PATENT DOCUMENTS

| CN | 108243468 A | 7/2018 |
| CN | 108243469 A | 7/2018 |
| WO | 2018/113661 A1 | 6/2018 |

OTHER PUBLICATIONS

Intel Corporation, "New WID: NR mobility enhancements", RP-181433, 3GPP TSG RAN Meeting #80, La Jolla, USA, May 21-25, 2018.

*Primary Examiner* — Abdelnabi O Musa
(74) *Attorney, Agent, or Firm* — ScienBiziP, P.C.

(57) ABSTRACT

The present disclosure provides a method performed by user equipment, user equipment, and a handover command generation method. The method performed by user equipment includes: receiving a handover command including a handover condition, and storing a handover configuration in the handover command, wherein when the handover condition is met, the user equipment performs the handover configuration corresponding to the handover condition; and if a master cell group (MCG) failure is detected or if it is detected that a security update needs to be performed, performing at least an operation related to the stored handover configuration. Therefore, user equipment can determine the validity of a handover command, thereby avoiding (Continued)

a service interruption caused by a connection failure resulting from a handover performed on the basis of an invalid handover command.

4 Claims, 3 Drawing Sheets

(56) References Cited

U.S. PATENT DOCUMENTS

| | | | |
|---|---|---|---|
| 2016/0174124 A1* | 6/2016 | Basu Mallick | H04W 36/30 |
| | | | 370/331 |
| 2017/0086107 A1* | 3/2017 | Hu | H04L 5/0048 |
| 2018/0035265 A1* | 2/2018 | Kim | H04W 4/06 |
| 2018/0035484 A1* | 2/2018 | Kim | H04W 76/19 |
| 2019/0281511 A1* | 9/2019 | Susitaival | H04W 36/0016 |
| 2019/0297547 A1* | 9/2019 | Tsai | H04W 24/08 |
| 2019/0380081 A1 | 12/2019 | Chang et al. | |
| 2019/0387438 A1 | 12/2019 | Chang et al. | |
| 2019/0387440 A1* | 12/2019 | Yiu | H04W 36/0072 |
| 2020/0022042 A1* | 1/2020 | Yin | H04W 36/00837 |
| 2020/0045745 A1* | 2/2020 | Cirik | H04B 7/0695 |
| 2020/0229043 A1* | 7/2020 | Yao | H04W 36/0016 |
| 2021/0168678 A1* | 6/2021 | Deenoo | H04W 36/0085 |
| 2021/0297909 A1* | 9/2021 | Lee | H04W 36/0061 |
| 2021/0321462 A1* | 10/2021 | Takahashi | H04W 74/0891 |
| 2022/0312282 A1* | 9/2022 | Chang | H04W 36/305 |
| 2022/0322173 A1* | 10/2022 | Chang | H04W 76/27 |

* cited by examiner

METHOD PERFORMED BY USER EQUIPMENT, USER EQUIPMENT, AND HANDOVER COMMAND GENERATION METHOD

TECHNICAL FIELD

The present disclosure relates to the technical field of wireless communications. More specifically, the present disclosure relates to a method performed by user equipment, user equipment, and a handover command generation method.

BACKGROUND

A new research project on 5G technical standards (see non-patent literature: RP-181433: New WID on NR (New Radio) mobility enhancements) was approved in the 3rd Generation Partnership Project (3GPP) RAN #80 plenary session held in June 2018. One of the research objectives of this project is to meet one of the mobility requirements in NR: seamless handover, namely, to achieve a handover interruption time period of 0 millisecond in a cell handover procedure. Among currently studied solutions for reducing a handover interruption time, a solution is referred to as a conditional handover (CHO). In the CHO mechanism, a base station delivers in advance a handover command to UE, and the UE is configured to perform a handover according to the previously received handover command when a certain condition is met, so that by delivering the handover command in advance, the success rate of receiving a handover command can be increased, thereby avoiding a service interruption delay caused by a handover failure resulting from a failure in receiving a handover command.

The present disclosure provides solutions to some problems encountered in implementation of the CHO in an NR system.

SUMMARY

In order to solve at least part of the aforementioned problems, the present disclosure provides a method performed by user equipment, user equipment, and a handover command generation handover method, and can solve the problem encountered in implementation of the CHO technology in an NR system. More specifically, the present disclosure provides solutions to problems regarding how UE manages a received CHO command in an NR system and how to determine the validity of the CHO command stored by the UE.

According to a first aspect of the present disclosure, a method performed by user equipment (UE) is provided, comprising: receiving a handover command comprising a handover condition, and storing a handover configuration in the handover command, wherein when the handover condition is met, the user equipment performs the handover configuration corresponding to the handover condition; and if a master cell group (MCG) failure is detected or if it is detected that a security update needs to be performed, performing at least an operation related to the stored handover configuration.

In the aforementioned method, optionally, if an MCG failure is detected, then a radio resource control (RRC) connection reestablishment procedure is initiated, and the stored handover configuration is discarded.

In the aforementioned method, optionally, if an MCG failure is detected, then a handover is performed on the basis of the stored handover configuration, and a target cell is accessed.

In the aforementioned method, optionally, if it is detected that a security update needs to be performed, then the stored handover configuration is discarded.

According to a second aspect of the present disclosure, a method performed by user equipment is provided, comprising: receiving a first handover command comprising a first handover condition, storing a first handover configuration in the first handover command, and starting a first handover configuration validity timer corresponding to the first handover configuration, wherein when the first handover condition is met, the user equipment performs the first handover configuration corresponding to the first handover condition, and the first handover configuration validity timer is used to specify a validity period of the first handover configuration; and if indication information is received from a network side, stopping or re-starting the first handover configuration validity timer according to the indication information.

In the aforementioned method, optionally, if a second handover command comprising the first handover condition is received as the indication information, and if the second handover command and the first handover command correspond to the same target cell and are associated with the same handover configuration validity timer, then the first handover configuration validity timer is re-started; otherwise, the first handover configuration validity timer is stopped.

In the aforementioned method, optionally, if a radio resource control (RRC) message comprising a stopping condition is received as the indication information, and if the stopping condition is met, then the first handover configuration validity timer is stopped.

In the aforementioned method, optionally, if a handover command not comprising a handover condition is received as the indication information, or if the first handover condition is met, then a handover is performed, and the first handover configuration validity timer is stopped.

According to a third aspect of the present disclosure, provided is a handover command generation method for generating a handover command used to perform a handover from a source base station to a target base station and comprising a handover condition, wherein when the handover condition is met, user equipment performs the handover corresponding to the handover condition, the handover command generation method comprising: transmitting, from the source base station to the target base station, a handover preparation information radio resource control (RRC) message comprising the handover condition; upon receiving the handover preparation information RRC message and deciding to accept the current handover, adding, by the target base station, the handover condition to a handover command RRC message, and transmitting the handover command RRC message to the source base station; and transmitting, by the source base station, the received handover command comprising the handover condition to the user equipment.

According to a fourth aspect of the present disclosure, user equipment is provided, comprising: a processor; and a memory, stored with instructions, wherein when executed by the processor, the instructions execute any aforementioned method performed by user equipment.

EFFECT OF INVENTION

According to the method performed by user equipment, the user equipment, and the handover command generation handover method in the present disclosure, a solution to the problem of generating and managing a handover command in a system supporting a conditional handover is provided, so that UE can determine the validity of the handover command, thereby avoiding a service interruption caused by a connection failure resulting from a handover performed by the UE on the basis of an invalid handover command.

BRIEF DESCRIPTION OF THE DRAWINGS

The above and other features of the present disclosure will become more apparent with the following detailed description in conjunction with the accompanying drawings.

DETAILED DESCRIPTION

The present disclosure is described in detail below with reference to the accompanying drawings and specific embodiments.

In the present disclosure, the terms "include" and "comprise" and derivatives thereof mean inclusion without limitation; the term "or" may have an inclusive meaning and means "and/or."

In the present specification, the following various embodiments for describing the principles of the present disclosure are merely illustrative and should not be interpreted in any way as limiting the scope of the disclosure. The following description with reference to the accompanying drawings is used to facilitate full understanding of the exemplary embodiments of the present disclosure defined by the claims and equivalents thereof. The following description includes a variety of specific details to facilitate understanding, but these details should be considered merely exemplary. Therefore, those of ordinary skill in the art should recognize that various changes and modifications may be made to the embodiments described herein without departing from the scope and spirit of the present disclosure. In addition, the description of the known function and structure is omitted for clarity and simplicity. In addition, the same reference numerals are used for similar functions and operations throughout the accompanying drawings.

A plurality of embodiments according to the present disclosure are specifically described below by using a Long Term Evolution (LTE)/NR mobile communication system and subsequent evolved versions thereof as an exemplary application environment. However, it is to be noted that the present disclosure is not limited to the following embodiments but may be applied to other wireless communications systems. In the present disclosure, unless otherwise specified, the concept of a cell and the concept of a base station are interchangeable. An LTE system may also refer to a 5G LTE system and a post-5G LTE system (such as an LTE system referred to as an eLTE system or an LTE system that can be connected to a 5G core network). In addition, the LTE can be replaced with an evolved universal terrestrial radio access network (E-UTRAN) or an evolved universal terrestrial radio access (E-UTRA). In the present disclosure, a source cell can also be referred to as a source base station, or can be a source beam or a source transmission point (TRP), and a target cell can also be referred to as a target base station, or can be a target beam or a target transmission point. The source cell refers to a base station serving UE before a handover procedure is executed, or a cell serving the UE or on which the UE camps before a cell reselection occurs. The target cell refers to a base station serving the UE after the handover procedure is executed, or in other words, a cell indicated in a handover command; or a cell serving the UE or on which the UE camps after the cell reselection occurs.

In the present application, after receiving a radio resource control (RRC) message including a handover command, the UE maintains communication, including data transmission, with the source base station before performing a handover, so as to further reduce data transmission interruption time.

Figure 1:
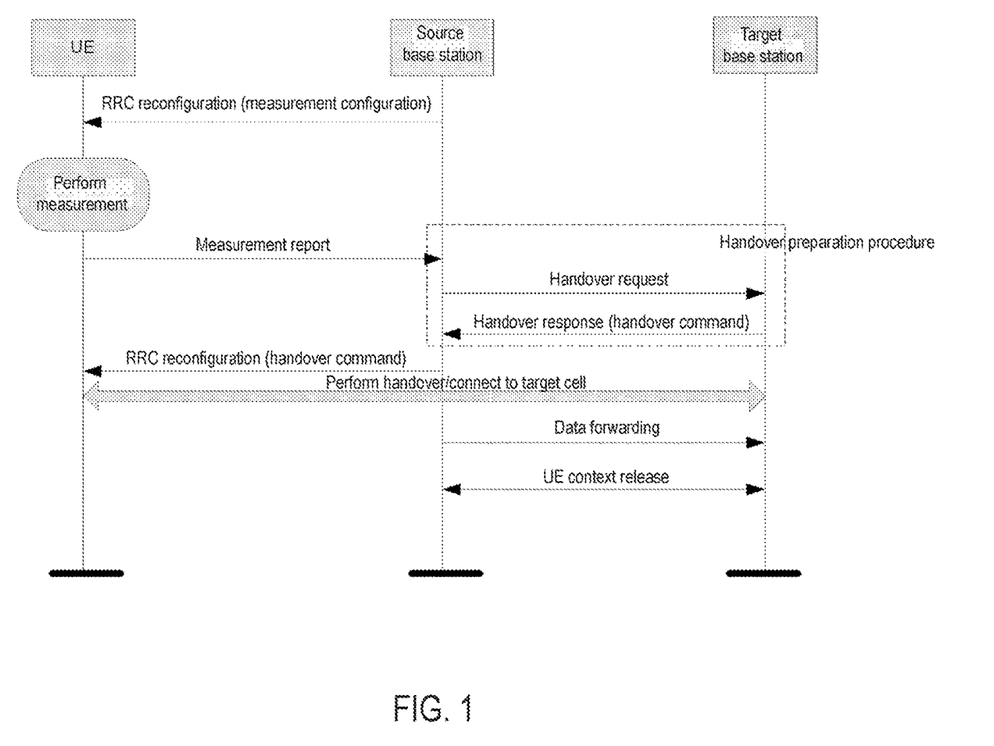
FIG. 1 is a schematic sequence diagram of a general handover procedure in an LTE/NR system.

Firstly, a general handover procedure in an LTE/NR system is briefly described. The mobility of a user in a connected state is implemented mainly by means of a handover procedure. The procedure is shown in FIG. 1, and is briefly described below:

Phase 1: A base station delivers a measurement configuration to user equipment (UE); the UE performs, on the basis of the measurement configuration, measurement on a radio link corresponding to a serving cell; and when a configured reporting condition is met, the UE transmits a measurement report to the base station. The base station determines, according to the received measurement report and other factors such as the payload of the base station, whether to hand over the UE.

Phase 2: If a handover is determined, then a source base station initiates a handover preparation procedure and sends a handover request message to a target base station; the target base station determines, according to context of the UE in the handover request message, available resources of the target base station, and other factors, whether to admit the UE. If so, then the target base station feeds back a handover acknowledgment message to the source base station, where the handover acknowledgment message includes a handover command.

Phase 3: The source base station delivers the handover command to the UE, and starts to forward data to the target base station. Upon receiving the handover command, the UE immediately executes the handover command and accesses the target base station; for example, the UE accesses the target base station via a random access procedure.

Phase 4: After confirming the successful access by the UE, the target base station sends a handover completion message to the source base station.

It can be seen from the above that, the handover procedure in the LTE system may incur data transmission interruption. In an LTE system of a subsequent version, optimizations for the handover procedure, such as random access-free handover, all aim to shorten a handover delay and reduce handover overheads.

Then, a conditional handover is described below. The 5G NR technology requires a shortest data interruption delay possible of 0 ms in a mobility handover process, so as to meet the mobility requirement for seamless handover in the NR. In the existing handover procedure, one reason for a handover failure and therefore a long data transmission interruption is a handover command receiving failure caused when the handover command is not delivered in a timely manner. A feasible method to address this problem is a conditional handover (CHO). In the conditional handover, a relatively conservative measurement report threshold is set, such that the base station acquires a measurement result in advance, and executes a handover preparation procedure with a selected target base station according to the measurement result. As such, the base station can deliver the handover command to the UE before an actual handover condition is met, where the handover command carries a handover execution condition. Unlike the existing handover mechanism in LTE, the present solution allows the UE not to perform a handover immediately after receiving a handover command. Instead, the UE performs detection according to a handover condition carried in the handover command message, and only when detecting that the configured handover condition is met, starts to execute the handover command and access a target cell. The above handover command is used to trigger the UE to perform network side-controlled mobility, namely a handover, and is usually referred to as an RRC reconfiguration message including an information element of synchronized reconfiguration (Reconfigurationwithsync) or an information element of mobility control information (MobilityControlInformation). The information element of synchronized reconfiguration or the information element of mobility control information includes configuration information of the target base station, is used to configure mobility information, such as the configuration information of the target base station, to the UE during the network side-controlled mobility, and is usually included in a master cell configuration (an information element of masterCellGroupConfig or an information element of cellgroupconfig for a master cell group) or a secondary cell configuration (an information element of secondaryCellGroupConfig or an information element of cellgroupconfig for a secondary cell group). In the present disclosure, the handover generally refers to a handover controlled by a network side or the UE, a cell change, a serving cell change, a master cell change, a master/secondary cell change, an intra-cell handover used for a security update, synchronized reconfiguration, and the like, performed in an RRC connected state.

Regarding the problem of generating and managing a handover command in a system supporting a conditional handover, the present disclosure provides the following implementation method. According to the implementation method, a handover command, a handover configuration in the handover command, and a handover configuration validity timer corresponding to the handover configuration can be effectively managed, so that UE can further determine the validity of the handover command, thereby avoiding a service interruption caused by a connection failure resulting from a handover performed by the UE on the basis of an invalid handover command.

Figure 2:
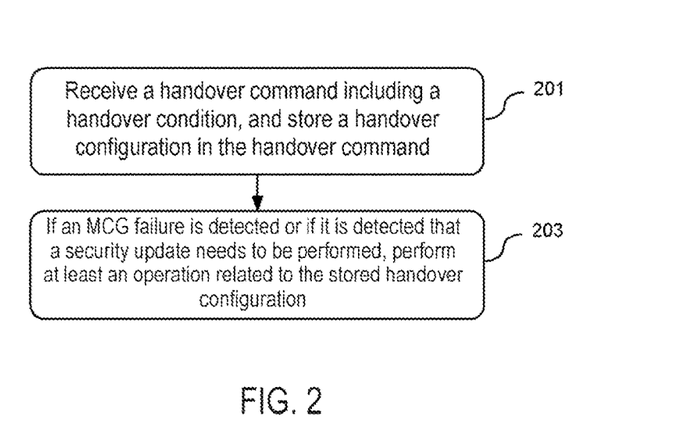
FIG. 2 is a flowchart of a method performed by user equipment according to the present disclosure.

FIG. 2 is a flowchart of a method performed by user equipment according to the present disclosure. As shown in FIG. 2, the method includes step S201 and step S203.

In step S201, a handover command including a handover condition is received, and a handover configuration in the handover command is stored, wherein when the handover condition is met, user equipment performs the handover configuration corresponding to the handover condition.

In step S203, if an MCG failure is detected or if it is detected that a security update needs to be performed, at least an operation related to the stored handover configuration is performed.

According to the above method, a solution for managing a handover configuration in a handover command including a handover condition is provided. If an MCG failure is detected or if it is detected that a security update needs to be performed, then at least an operation related to the stored handover configuration is performed. For example, if an MCG failure is detected, then an RRC connection reestablishment procedure is performed, and the stored handover configuration is discarded; or, a handover is performed on the basis of the stored handover configuration, and a target cell is accessed. Therefore, a handover configuration in a handover command including a handover condition can be effectively managed.

Figure 3:
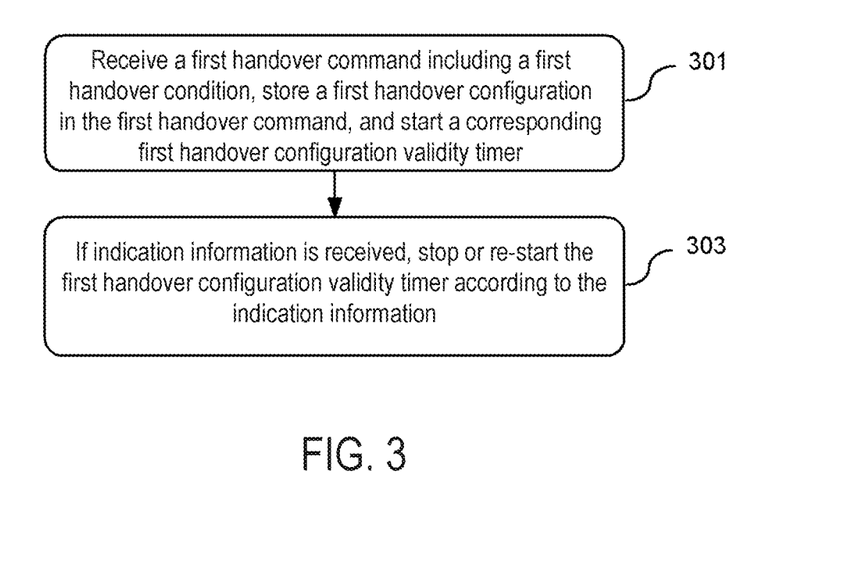
FIG. 3 is a flowchart of another method performed by user equipment according to the present disclosure.

FIG. 3 is a flowchart of another method performed by user equipment according to the present disclosure. As shown in FIG. 3, the method includes step S301 and step S303.

In step S301, a first handover command including a first handover condition is received, a first handover configuration in the first handover command is stored, and a corresponding first handover configuration validity timer is started, wherein when the first handover condition is met, user equipment performs the corresponding first handover configuration, and the first handover configuration validity timer is used to specify a validity period of the first handover configuration.

In step S303, if indication information is received from a network side, the first handover configuration validity timer is stopped or re-started according to the indication information.

According to the above method, a solution for managing a handover configuration validity timer corresponding to a handover configuration in a handover command including a handover condition is provided. The handover configuration validity timer is used to specify a validity period of the handover configuration, and for example, the validity period of the handover configuration is configured to be an operating period of the timer. If indication information is received from a network side, then the handover configuration validity timer is stopped or re-started according to the indication information. For example, if an RRC message including a stopping condition is received as the indication information, and if the stopping condition is met, then the handover configuration validity timer is stopped. Therefore, a handover configuration validity timer corresponding to a handover configuration in a handover command including a handover condition can be effectively managed, and user equipment can determine the validity of the handover command, thereby avoiding a service interruption caused by a connection failure resulting from a handover performed on the basis of an invalid handover command.

Figure 4:
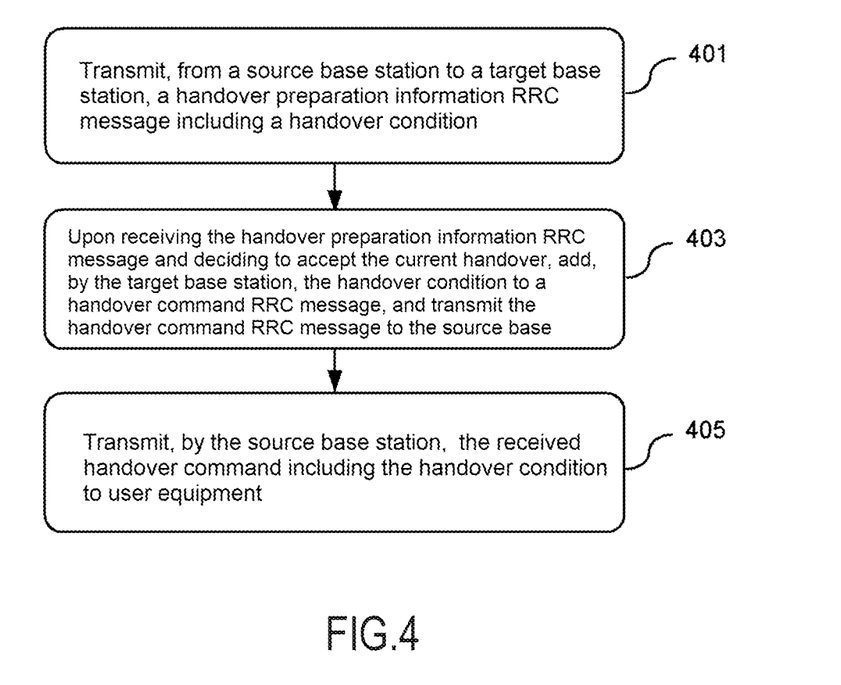
FIG. 4 is a flowchart of a handover command generation method according to the present disclosure.

FIG. 4 is a flowchart of a handover command generation method according to the present disclosure. As shown in FIG. 4, the method includes step S401, step S403, and step S405.

In step S401, a source base station transmits to a target base station a handover preparation information RRC message including a handover condition.

In step S403, upon receiving the handover preparation information RRC message and deciding to accept the current handover, the target base station adds the handover condition to a handover command RRC message and transmits the handover command RRC message to the source base station.

In step S405, the source base station transmits to user equipment the received handover command including the handover condition.

According to the above method, a management solution for generating a handover command including a handover condition is provided. When generating a handover command, a target base station adds, to the handover command, a handover condition received from a source base station in advance, so as to generate a conditional handover command, so that a required handover command including a handover condition can be flexibly generated. Therefore, generation of a handover command including a handover condition can be effectively managed.

Several embodiments of the present disclosure are described in detail below.

Handover Configuration Management Method

Embodiment 1

This embodiment provides a method for managing a handover configuration when a master cell group (MCG) failure occurs. The method is performed on UE, and includes:

Step 1: the UE initiates an RRC connection reestablishment procedure; and

Step 2: if a handover configuration is stored on the UE, the stored handover configuration is discarded/removed.

The RRC connection reestablishment procedure is used to reestablish an RRC connection if an MCG failure occurs. The occurrence of an MCG failure may refer to the following: a radio link failure of an MCG is detected, equivalent to poor link quality; synchronized reconfiguration of an MCG fails; an integrity verification failure indication related to a signaling radio bearer (SRB) or a data radio bearer (DRB) is received from a lower layer; RRC connection reconfiguration fails; an NR/LTE mobility failure occurs (equivalent to a mobility failure between systems of different radio access technologies when a source base station belongs to an NR/LTE system); and the like.

Prior to step 1, the method further includes: the UE receives a handover command transmitted from a base station and including a first condition and stores a handover configuration in the handover command. The handover configuration refers to an RRC configuration generated by the UE according to the configuration in the handover command. Optionally, the handover configuration refers to an RRC configuration generated by the UE according to the configuration in the handover command and a current RRC configuration of the UE. The first condition refers to a handover condition. That is, only when the first condition is met would the UE perform a handover and apply the handover configuration generated on the basis of the handover command. For example, the first condition may be a measurement event. For example, the first condition may be that signal quality in a neighboring cell is superior to that in a serving cell by a value exceeding a threshold for a period of time. The neighboring cell corresponds to the target cell for handover.

The discarding/removal of the stored handover configuration can also be described as considering the stored handover configuration to be invalid.

When in a dual connectivity configuration, the MCG refers to a serving cell group corresponding to a master base station and including a master cell and zero or one or more secondary cells. When not in a dual connectivity configuration, the MCG refers to all serving cells, including a master cell, of the UE.

Optionally, step 2 further includes stopping a corresponding handover configuration validity timer. On the basis of the handover configuration validity timer, a UE side manages a received and stored handover configuration. In other words, when the timer runs, the UE considers a received or stored handover configuration to be valid; when the timer does not run, for example, when the timer times out or is stopped, the UE considers the received or stored handover configuration to be invalid, or the UE removes/clears/discards the received or stored handover configuration information. The handover configuration validity timer is configured by the base station using an RRC message, such as a first RRC message including a handover command. The configuration of the validity timer includes a value of the timer. Optionally, the validity timer can be configured by a source cell or by a target cell. Optionally, in a scenario in which a plurality of handover commands or a plurality of handover target cells are supported, the validity timer and/or a configuration thereof can distinguish each handover command or distinguish each target cell, or the validity timer is configured to distinguish a handover command or a target cell, and a value thereof is a common value shared among all handover commands or target cells.

Embodiment 2

This embodiment provides a method for managing a handover configuration when an MCG failure occurs. The method is performed on UE, and includes:

Step 1: the UE initiates an RRC connection reestablishment procedure, and transmits an RRC reestablishment request message to a base station;

Step 2: the UE receives a response message, such as an RRC reestablishment message, used for responding to the RRC reestablishment request message; and Step 3: if a handover configuration is stored on the UE, the stored handover configuration is discarded/removed.

The RRC connection reestablishment procedure is used to reestablish an RRC connection if an MCG failure occurs. The occurrence of an MCG failure may refer to the following: a radio link failure of an MCG is detected, equivalent to poor link quality; synchronized reconfiguration of an MCG fails; an integrity verification failure indication related to an SRB or a DRB is received from a lower layer; RRC connection reconfiguration fails; an NR/LTE mobility failure occurs (equivalent to a mobility failure between systems of different radio access technologies when a source base station belongs to an NR/LTE system); and the like.

Prior to step 1, the method further includes: the UE receives a handover command transmitted from the base station and including a first condition and stores a handover configuration in the handover command. The handover configuration refers to an RRC configuration generated by the UE according to the configuration in the handover command. Optionally, the handover configuration refers to an RRC configuration generated by the UE according to the configuration in the handover command and a current RRC configuration of the UE. The first condition refers to a handover condition. That is, only when the first condition is met would the UE perform a handover and apply the handover configuration generated on the basis of the handover command. For example, the first condition may be a measurement event. For example, the first condition may be that signal quality in a neighboring cell is superior to that in a serving cell by a value exceeding a threshold for a period of time. The neighboring cell corresponds to the target cell for handover.

The discarding/removal of the stored handover configuration can also be described as considering the stored handover configuration to be invalid.

Optionally, step 3 further includes stopping a corresponding handover configuration validity timer. On the basis of the handover configuration validity timer, a UE side manages a received and stored handover configuration. In other words, when the timer runs, the UE considers a received or stored handover configuration to be valid; when the timer does not run, for example, when the timer times out or is stopped, the UE considers the received or stored handover configuration to be invalid, or the UE removes/clears/discards the received or stored handover configuration information. The handover configuration validity timer is configured by the base station using an RRC message, such as a first RRC message including a handover command. The configuration of the validity timer includes a value of the timer. Optionally, the validity timer can be configured by a source cell or by a target cell. Optionally, in a scenario in which a plurality of handover commands or a plurality of handover target cells are supported, the validity timer and/or a configuration thereof can distinguish each handover command or distinguish each target cell, or the validity timer is configured to distinguish a handover command or a target cell, and a value thereof is a common value shared among all handover commands or target cells.

Embodiment 3

This embodiment provides another method for managing a handover configuration when an MCG failure occurs. The method is performed on UE, and includes:

Step 1: UE detects an MCG failure; and

Step 2: if a handover configuration is stored on the UE, the UE performs a handover on the basis of the stored handover configuration and accesses a target cell.

The detection of an MCG failure may refer to the following: a radio link failure of an MCG is detected, equivalent to poor link quality; synchronized reconfiguration of an MCG fails; an integrity verification failure indication related to an SRB or a DRB is received from a lower layer; RRC connection reconfiguration fails; an NR/LTE mobility failure occurs (equivalent to a mobility failure between systems of different radio access technologies when a source base station belongs to an NR/LTE system); and the like.

Prior to step 1, the method further includes: the UE receives a handover command transmitted from a base station and including a first condition and stores a handover configuration in the handover command. The handover configuration refers to an RRC configuration generated by the UE according to the configuration in the handover command. Optionally, the handover configuration refers to an RRC configuration generated by the UE according to the configuration in the handover command and a current RRC configuration of the UE. The first condition refers to a handover condition. That is, only when the first condition is met would the UE perform a handover and apply the handover configuration generated on the basis of the handover command. For example, the first condition may be a measurement event. For example, the first condition may be that signal quality in a neighboring cell is superior to that in a serving cell by a value exceeding a threshold for a period of time. The neighboring cell corresponds to the target cell for handover.

Unlike a conventional system in which UE initiates an RRC connection reestablishment procedure to reestablish an RRC connection when an MCG failure occurs, the UE of this embodiment uses the stored handover configuration thereon to access the target base station, so that the UE can more quickly resume a connection to a network side, thereby reducing a service interruption delay. Optionally, this embodiment is also applicable to a scenario in which UE stores a plurality of handover configurations with respect to a plurality of handover target cells. In this scenario, the UE determines one target cell and then performs a handover. For example, the UE may select, based on downlink quality of target cells, a target cell having the highest link quality, and then perform a handover.

Embodiment 4

This embodiment provides another method for managing a handover configuration when an MCG failure occurs. The method is performed on UE, and includes:

Step 1: the UE initiates an MCG failure information procedure; and

Step 2: if a handover configuration is stored on the UE, the stored handover configuration is discarded/removed.

The MCG failure information procedure is initiated when the UE detects an MCG failure and is used to report to a base station that an MCG failure occurs. Optionally, if an MCG failure is detected and MCG transmission is not suspended, then the UE initiates an MCG failure information procedure, and reports the MCG failure information, such as the cause of the MCG failure, to the base station. The detection of an MCG failure may refer to the following: a radio link failure of an MCG is detected, equivalent to poor link quality; synchronized reconfiguration of an MCG fails; an integrity verification failure indication related to an SRB or a DRB is received from a lower layer; RRC connection reconfiguration fails; an NR/LTE mobility failure occurs (equivalent to a mobility failure between systems of different radio access technologies when a source base station belongs to an NR/LTE system); and the like.

Prior to step 1, the method further includes: the UE receives a handover command transmitted from a base station and including a first condition and stores a handover configuration in the handover command. The handover configuration refers to an RRC configuration generated by the UE according to the configuration in the handover command. Optionally, the handover configuration refers to an RRC configuration generated by the UE according to the configuration in the handover command and a current RRC configuration of the UE. The first condition refers to a handover condition. That is, only when the first condition is met would the UE perform a handover and apply the handover configuration generated on the basis of the handover command. For example, the first condition may be a measurement event. For example, the first condition may be that signal quality in a neighboring cell is superior to that in a serving cell by a value exceeding a threshold for a period of time. The neighboring cell corresponds to the target cell for handover.

The discarding/removal of the stored handover configuration can also be described as considering the stored handover configuration to be invalid.

Optionally, step 2 further includes stopping a corresponding handover configuration validity timer. On the basis of the handover configuration validity timer, a UE side manages a received and stored handover configuration. In other words, when the timer runs, the UE considers a received or stored handover configuration to be valid; when the timer does not run, for example, when the timer times out or is stopped, the UE considers the received or stored handover configuration to be invalid, or the UE removes/clears/discards the received or stored handover configuration information. The handover configuration validity timer is configured by the base station using an RRC message, such as a first RRC message including a handover command. The configuration of the validity timer includes a value of the timer. Optionally, the validity timer can be configured by a source cell or by a target cell. Optionally, in a scenario in which a plurality of handover commands or a plurality of handover target cells are supported, the validity timer and/or a configuration thereof can distinguish each handover command or distinguish each target cell, or the validity timer is configured to distinguish a handover command or a target cell, and a value thereof is a common value shared among all handover commands or target cells.

Embodiment 5

This embodiment provides a method for managing a handover configuration during a security update. The method is performed on UE, and includes:

Step 1: the UE initiates a security update procedure, or the UE receives an RRC message transmitted from a base station and including a security update indication; and Step 2: if a handover configuration is stored on the UE, the stored handover configuration is discarded/removed.

The security update procedure is used to update security context, such as a security algorithm and a security key, on the UE, and may also be referred to as a security key update procedure. Optionally, the security update indication is a key update (keyrefresh) information element included in a radio bearer configuration information element in an RRC message.

Prior to step 1, the method further includes: the UE receives a handover command transmitted from the base station and including a first condition and stores a handover configuration in the handover command. The handover configuration refers to an RRC configuration generated by the UE according to the configuration in the handover command. Optionally, the handover configuration refers to an RRC configuration generated by the UE according to the configuration in the handover command and a current RRC configuration of the UE. The first condition refers to a handover condition. That is, only when the first condition is met would the UE perform a handover and apply the handover configuration generated on the basis of the handover command. For example, the first condition may be a measurement event. For example, the first condition may be that signal quality in a neighboring cell is superior to that in a serving cell by a value exceeding a threshold for a period of time. The neighboring cell corresponds to the target cell for handover.

Optionally, step 2 further includes stopping a corresponding handover configuration validity timer. On the basis of the handover configuration validity timer, a UE side manages a received and stored handover configuration. In other words, when the timer runs, the UE considers a received or stored handover configuration to be valid; when the timer does not run, for example, when the timer times out or is stopped, the UE considers the received or stored handover configuration to be invalid, or the UE removes/clears/discards the received or stored handover configuration information. The handover configuration validity timer is configured by the base station using an RRC message, such as a first RRC message including a handover command. The configuration of the validity timer includes a value of the timer. Optionally, the validity timer can be configured by a source cell or by a target cell. Optionally, in a scenario in which a plurality of handover commands or a plurality of handover target cells are supported, the validity timer and/or a configuration thereof can distinguish each handover command or distinguish each target cell, or the validity timer is configured to distinguish a handover command or a target cell, and a value thereof is a common value shared among all handover commands or target cells.

Method for Managing a Handover Configuration Validity Timer

Embodiment 6

This embodiment provides a method for managing a handover configuration validity timer. The method is performed on UE, and includes:

Step 1: the UE receives a first handover command transmitted from a base station and including a first condition, the first handover command being a handover command with respect to a first target cell.

Step 2: the UE receives a second handover command transmitted from the base station and including the first condition, the second handover command being a handover command with respect to the first target cell.

Step 3: the UE stops a handover configuration validity timer with respect to the first target cell. The timer is a timer associated with the first handover command.

Step 1 further includes: the UE receives a handover command transmitted from the base station and including the first condition, stores a handover configuration in the handover command, and starts a corresponding handover configuration validity timer. The handover configuration refers to an RRC configuration generated by the UE according to the configuration in the handover command. Optionally, the handover configuration refers to an RRC configuration generated by the UE according to the configuration in the handover command and a current RRC configuration of the UE. The first condition refers to a handover condition. That is, only when the first condition is met would the UE perform a handover and apply the handover configuration generated on the basis of the handover command. For example, the first condition may be a measurement event. For example, the first condition may be that signal quality in a neighboring cell is superior to that in a serving cell by a value exceeding a threshold for a period of time. The neighboring cell corresponds to the target cell for handover. In this embodiment, the first condition in step 1 may be the same as or different from the first condition in step 2.

On the basis of the handover configuration validity timer, a UE side manages a received and stored handover configuration. In other words, when the timer runs, the UE considers a received or stored handover configuration to be valid; when the timer does not run, for example, when the timer times out or is stopped, the UE considers the received or stored handover configuration to be invalid, or the UE removes/clears/discards the received or stored handover configuration information. The handover configuration validity timer is configured by the base station using an RRC message, such as a first RRC message including a handover command. The configuration of the validity timer includes a value of the timer. Optionally, the validity timer can be configured by a source cell or by a target cell. Optionally, in a scenario in which a plurality of handover commands or a plurality of handover target cells are supported, the validity timer and/or a configuration thereof can distinguish each handover command or distinguish each target cell, or the validity timer is configured to distinguish a handover command or a target cell, and a value thereof is a common value shared among all handover commands or target cells.

Optionally, if a single handover configuration validity timer is maintained for different conditional handover commands (such as the first handover command and the second handover command in step 1 and step 2) or handover configurations for the same target cell, step 3 is described as: re-starting a handover configuration validity timer with respect to the first target cell.

Embodiment 7

This embodiment provides a method for managing a conditional handover configuration validity timer. The method is performed on UE, and includes:

Step 1: an RRC message transmitted from a base station and including a second condition is received.

Step 2: when the second condition is met, the UE or UE RRC stops a handover configuration validity timer.

The second condition is configured by the base station using the RRC message. The RRC message may be a system message or a dedicated RRC message, such as RRC connection reconfiguration, and may further be a handover command RRC message including a first condition. Optionally, the second condition can be configured by a target cell or by a source cell.

Based on the measurement events defined in LTE, the second condition can be any combination of one or more of the following events, but is not limited to the following events:

event 1: a signal quality measurement value of a serving cell is greater than a threshold;

event 2: a signal quality measurement value of a neighboring cell is less than a threshold;

event 3: a signal quality measurement value of a serving cell is higher than a signal quality measurement value of a neighboring cell by a threshold; and event 4: a signal quality measurement value of a serving cell is greater than one threshold, and a signal quality measurement value of a neighboring cell is less than another threshold.

The neighboring cell in the above event refers to the corresponding target cell in the handover command. Optionally, the serving cell and the target cell in the above event can be of different Radio Access Technologies (RATs). Optionally, the configuration of the second condition or event can be a configuration based on a measurement event in LTE. For example, when the second condition is the event 3, the threshold in the event is set to "th," and a Time To Trigger (TTT) value is set to duration, the UE detects signal quality in the source cell and the target cell. When a difference between a measurement value of signal quality in the source cell and that in the neighboring cell is greater than or equal to "th," and this situation lasts for the duration, the UE considers that the second condition is met.

On the basis of the handover configuration validity timer, a UE side manages a received and stored handover configuration. In other words, when the timer runs, the UE considers a received or stored handover configuration to be valid; when the timer does not run, for example, when the timer times out or is stopped, the UE considers the received or stored handover configuration to be invalid, or the UE removes/clears/discards the received or stored handover configuration information. The handover configuration validity timer is configured by the base station using an RRC message, such as a first RRC message including a handover command. The configuration of the validity timer includes a value of the timer. Optionally, the validity timer can be configured by a source cell or by a target cell. Optionally, in a scenario in which a plurality of handover commands or a plurality of handover target cells are supported, the validity timer and/or a configuration thereof can distinguish each handover command or distinguish each target cell, or the validity timer is configured to distinguish a handover command or a target cell, and a value thereof is a common value shared among all handover commands or target cells.

Prior to step 1, the method further includes: the UE receives a handover command transmitted from the base station and including the first condition, stores a handover configuration in the handover command, and starts a corresponding handover configuration validity timer. The handover configuration refers to an RRC configuration generated by the UE according to the configuration in the handover command. Optionally, the handover configuration refers to an RRC configuration generated by the UE according to the configuration in the handover command and a current RRC configuration of the UE. The first condition refers to a handover condition. That is, only when the first condition is met would the UE perform a handover and apply the handover configuration generated on the basis of the handover command. For example, the first condition may be a measurement event. For example, the first condition may be that signal quality in a neighboring cell is superior to that in a serving cell by a value exceeding a threshold for a period of time. The neighboring cell corresponds to the target cell for handover.

This embodiment is also applicable to a scenario in which a plurality of handover commands or a plurality of handover target cells are supported. In this scenario, the foregoing operations in this embodiment are performed individually for a handover command or a handover target cell. Specifically, the configuration of the second condition can be configured by each handover target cell or can be shared by all handover target cells. In the above-mentioned UE operation of this embodiment, when the second condition corresponding to a handover target cell is met, the UE performs the corresponding operation of step 2 on only a handover configuration corresponding to a corresponding handover target cell.

Embodiment 8

This embodiment provides a method for managing a handover configuration validity timer. The method is performed on UE, and includes:

Step 1: the UE performs a handover.

Step 2: the UE stops a handover configuration validity timer.

The UE performing a handover in step 1 can be the UE performing a conditional handover on the basis of a stored handover configuration, and can also be performing a conventional handover, equivalent to the UE immediately performing a handover upon receiving a handover command not including the first condition. If the UE performs a conditional handover in step 1, then, prior to step 1, the method further includes: the UE receives a handover command transmitted from the base station and including the first condition, stores a handover configuration in the handover command, and starts a corresponding handover configuration validity timer. The handover configuration refers to an RRC configuration generated by the UE according to the configuration in the handover command. Optionally, the handover configuration refers to an RRC configuration generated by the UE according to the configuration in the handover command and a current RRC configuration of the UE. The first condition refers to a handover condition. That is, only when the first condition is met would the UE perform a handover and apply the handover configuration generated on the basis of the handover command. For example, the first condition may be a measurement event. For example, the first condition may be that signal quality in a neighboring cell is superior to that in a serving cell by a value exceeding a threshold for a period of time. The neighboring cell corresponds to the target cell for handover.

On the basis of the handover configuration validity timer, a UE side manages a received and stored handover configuration. In other words, when the timer runs, the UE considers a received or stored handover configuration to be valid; when the timer does not run, for example, when the timer times out or is stopped, the UE considers the received or stored handover configuration to be invalid, or the UE removes/clears/discards the received or stored handover configuration information. The handover configuration validity timer is configured by the base station using an RRC message, such as a first RRC message including a handover command. The configuration of the validity timer includes a value of the timer. Optionally, the validity timer can be configured by a source cell or by a target cell. Optionally, in a scenario in which a plurality of handover commands or a plurality of handover target cells are supported, the validity timer and/or a configuration thereof can distinguish each handover command or distinguish each target cell, or the validity timer is configured to distinguish a handover command or a target cell, and a value thereof is a common value shared among all handover commands or target cells.

Preferably, the handover configuration validity timer in step 2 refers to a handover configuration validity timer other than a handover configuration validity timer corresponding to a target cell to which the UE currently performs a handover. Alternatively, the handover configuration validity timer in step 2 can be a handover configuration validity timer corresponding to target cells in all handover configurations stored by the UE.

The performing a handover in step 1 can also be described as applying an RRC configuration including the handover command.

Method for Generating a Conditional Command

In the prior art, a handover command delivered to UE is generated by a target base station and is delivered to the UE by a source base station. During this procedure, the source base station does not modify the handover command. It is considered that a handover decision is made by the source base station. Thus, during a conditional handover, the first condition used for a conditional handover should be preferably configured by the source base station. However, how to add the first condition configured by the source base station to a handover command that cannot be modified by the source base station becomes a problem. The following embodiments provide methods for addressing the problem.

Embodiment 9

This embodiment provides a method for generating a conditional handover command, and the method is performed on a source base station and a target base station of a handover.

Step 1: the source base station initiates a handover preparation procedure and transmits to the target base station a handover preparation information (HandoverPreparationInformation) RRC message including a first condition. The first condition can indicate to the target base station that the current handover is a conditional handover. The first condition refers to a handover condition. That is, only when the first condition is met would the UE perform a handover and apply the handover configuration generated on the basis of the handover command. For example, the first condition may be a measurement event. For example, the first condition may be that signal quality in a neighboring cell is superior to that in a serving cell by a value exceeding a threshold for a period of time. The neighboring cell corresponds to the target cell for handover.

Step 2: after the target base station receives the handover preparation information RRC message transmitted from the source base station and including the first condition, if the target base station decides to accept the current handover of the UE, then the target base station transmits to the source base station a handover command RRC message including the first condition. That is, the target base station adds the first condition received in step 1 to the handover command RRC message generated thereby and transmits the handover command RRC message to the source base station.

Step 3: the source base station delivers to the UE the received handover command including the first condition.

The handover preparation information RRC message including the first condition in step 1 is included in an XnAP handover request message, and the handover command RRC message including the first condition in step 2 is included in an XnAP handover response message. Xn is an interface between the source base station and the target base station in an NR system, and corresponds to an X2 interface in an LTE system.

Embodiment 10

This embodiment provides a method for generating a conditional handover command, and corresponding to embodiment 9, the method is performed on a source base station of a handover.

Step 1: the source base station initiates a handover preparation procedure and transmits to the target base station a handover preparation information (HandoverPreparationInformation) RRC message including a first condition. The first condition can indicate to the target base station that the current handover is a conditional handover. The first condition refers to a handover condition. That is, only when the first condition is met would the UE perform a handover and apply the handover configuration generated on the basis of the handover command. For example, the first condition may be a measurement event. For example, the first condition may be that signal quality in a neighboring cell is superior to that in a serving cell by a value exceeding a threshold for a period of time. The neighboring cell corresponds to the target cell for handover.

Step 2: an X2AP or XnAP message transmitted from the target base station and including a handover command RRC message is received, the handover command RRC message including the first condition used for the conditional handover.

Step 3: the handover command RRC message including the first condition is delivered to the UE.

The handover preparation information RRC message including the first condition in step 1 is included in an XnAP handover request message, and the handover command RRC message including the first condition in step 2 is included in an XnAP handover response message. Xn is an interface between the source base station and the target base station in an NR system, and corresponds to an X2 interface in an LTE system.

Embodiment 11

This embodiment provides a method for generating a conditional handover command, and corresponding to embodiment 9, the method is performed on a target base station of a handover.

Step 1: a handover preparation information (HandoverPreparationInformation) RRC message transmitted from a source base station and including a first condition is received. The first condition can indicate to the target base station that the current handover is a conditional handover. The first condition refers to a handover condition. That is, only when the first condition is met would the UE perform a handover and apply the handover configuration generated on the basis of the handover command. For example, the first condition may be a measurement event. For example, the first condition may be that signal quality in a neighboring cell is superior to that in a serving cell by a value exceeding a threshold for a period of time. The neighboring cell corresponds to the target cell for handover.

Step 2: after the handover preparation information RRC message transmitted from the source base station and including the first condition, if the target base station decides to accept the current handover of the UE, then a handover command RRC message including the first condition is transmitted to the source base station. That is, the target base station adds the first condition received in step 1 to the handover command RRC message generated thereby and transmits the handover command RRC message to the source base station.

The handover preparation information RRC message including the first condition in step 1 is included in an XnAP handover request message, and the handover command RRC message including the first condition in step 2 is included in an XnAP handover response message. Xn is an interface between the source base station and the target base station in an NR system, and corresponds to an X2 interface in an LTE system.

In the present disclosure, the term "base station" refers to a mobile communication data and control switching center with a larger transmit power and a wider coverage area, and has functions of resource distribution scheduling, data receiving and transmitting, and the like. The term "user equipment" refers to a user mobile terminal, for example, a terminal device capable of performing wireless communication with a base station or a micro base station, including a mobile phone, a notebook computer and the like.

The methods and related devices according to the present disclosure have been described above in conjunction with preferred embodiments. It should be understood by those skilled in the art that the methods shown above are only exemplary. The method according to the present disclosure is not limited to steps or sequences shown above. The base station and user equipment shown above may include more modules. For example, the base station and user equipment may further include modules that may be developed or will be developed in the future to be applied to a base station, an MME, or UE. Various identifiers shown above are only exemplary, not for limitation, and the present disclosure is not limited to specific information elements serving as examples of these identifiers. Those skilled in the art can make various alterations and modifications according to the teachings of the illustrated embodiments.

Figure 5:
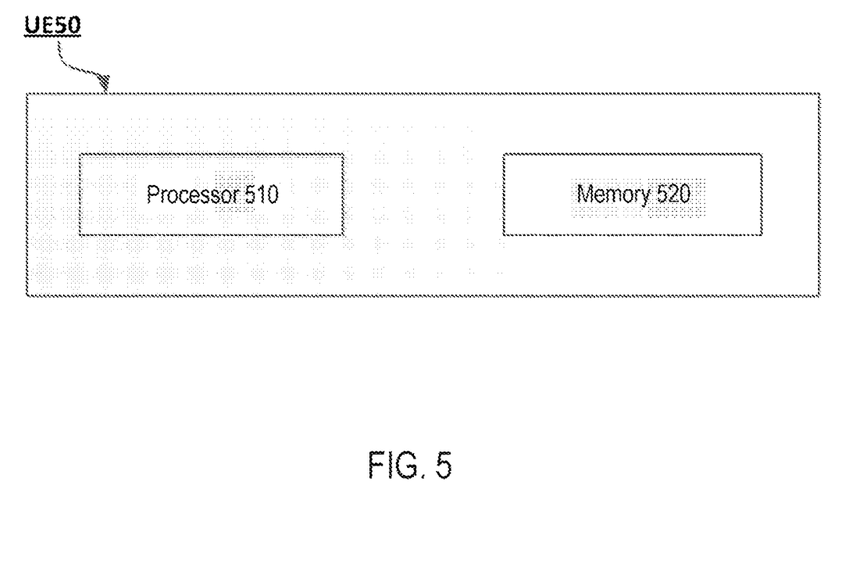
FIG. 5 is a block diagram of the user equipment involved in the present disclosure.

FIG. 5 shows a block diagram of user equipment (UE) 50 according to an embodiment of the present disclosure. As shown in FIG. 5, the UE 50 includes a processor 510 and a memory 520. The processor 510 may include, for example, a microprocessor, a microcontroller, an embedded processor, and so on. The memory 520 may include, for example, a volatile memory (for example, a random access memory (RAM)), a hard disk drive (HDD), a non-volatile memory (for example, a flash memory), or other memories. Program instructions are stored on the memory 520. When executed by the processor 510, the instructions can execute the aforementioned method in the user equipment as described in detail in the present disclosure.

The program running on the device according to the present disclosure may be a program that enables a computer to implement the functions of the embodiments of the present disclosure by controlling a central processing unit (CPU). The program or information processed by the program can be stored temporarily in a volatile memory (e.g., Random Access Memory (RAM)), a Hard Disk Drive (HDD), a non-volatile memory (e.g., flash memory), or other memory systems.

The program for implementing the functions of the embodiments of the present disclosure may be recorded on a computer-readable recording medium. The corresponding functions can be achieved by reading programs recorded on the recording medium and executing these programs by the computer system. The so-called "computer system" may be a computer system embedded in the device, which may include operating systems or hardware (e.g., peripherals). The "computer-readable recording medium" may be a semiconductor recording medium, an optical recording medium, a magnetic recording medium, a short-time dynamic memory program, or any other recording medium readable by a computer.

Various features or functional modules of the device used in the foregoing embodiments may be implemented or executed by circuits (e.g., monolithic or multi-chip integrated circuits). Circuits designed to execute the functions described in this description may include general-purpose processors, Digital Signal Processors (DSPs), Application Specific Integrated Circuits (ASICs), Field Programmable Gate Arrays (FPGAs) or other programmable logic devices, discrete gates or transistor logic, or discrete hardware components, or any combination of the above. The general-purpose processor may be a microprocessor, or may be any existing processor, a controller, a microcontroller, or a state machine. The circuit may be a digital circuit or an analog circuit. When new integrated circuit technologies that replace existing integrated circuits emerge because of the advances in semiconductor technology, one or a plurality of embodiments of the present disclosure may also be implemented using these new integrated circuit technologies.

Furthermore, the present disclosure is not limited to the embodiments described above. Although various examples of the described embodiments have been described, the present disclosure is not limited thereto. Fixed or non-mobile electronic devices mounted indoors or outdoors, such as AV equipment, kitchen equipment, cleaning equipment, air conditioner, office equipment, vending machines, and other household appliances, may be used as terminal devices or communications devices.

The embodiments of the present disclosure have been described in detail above with reference to the accompanying drawings. However, the specific structures are not limited to the above embodiments. The present disclosure also includes any design modifications that do not depart from the substance of the present disclosure. In addition, various modifications may be made to the present disclosure within the scope of the claims. Embodiments resulted from the appropriate combinations of the technical means disclosed in different embodiments are also included within the technical scope of the present disclosure. In addition, components with the same effect described in the above embodiments may be replaced with one another.

The invention claimed is:

1. A User Equipment (UE), comprising:
   a processor; and
   a memory, wherein the memory stores instructions that cause the processor to:
   receive a Radio Resource Control (RRC) reconfiguration message which includes (i) a conditional handover configuration and (ii) a cellgroupconfig information element (IE) for a master cell group (MCG), the cellgroupconfig IE including a Reconfigurationwithsync IE;
   store the conditional handover configuration;
   initiate an RRC connection reestablishment procedure when a radio link failure of the MCG is detected, wherein the RRC connection reestablishment procedure is initiated in a state where the conditional handover configuration is stored in the UE; and
   remove, after the RRC connection reestablishment procedure is initiated, the stored conditional handover configuration responsive to determining that the UE has stored the conditional handover configuration.

2. The UE according to claim 1, wherein:
the conditional handover configuration includes a handover condition, and is used for the UE to execute a handover command when the handover condition is fulfilled.

3. A control method in a User Equipment (UE), comprising:
receiving a Radio Resource Control (RRC) message which includes (i) a conditional handover configuration and (ii) a cellgroupconfig information element (IE) for a master cell group (MCG), the cellgroupconfig IE including a Reconfigurationwithsync IE;
storing the conditional handover configuration;
initiating an RRC connection reestablishment procedure when a radio link failure of the MCG is detected, wherein the RRC connection reestablishment procedure is initiated in a state where the conditional handover configuration is stored in the UE; and
removing, after the RRC connection reestablishment procedure is initiated, the stored conditional handover configuration responsive to determining that the UE has stored the conditional handover configuration.

4. The control method according to claim 3, wherein:
the conditional handover configuration includes a handover condition, and is used for the UE to execute a handover command when the handover condition is fulfilled.

* * * * *